Figure 1:
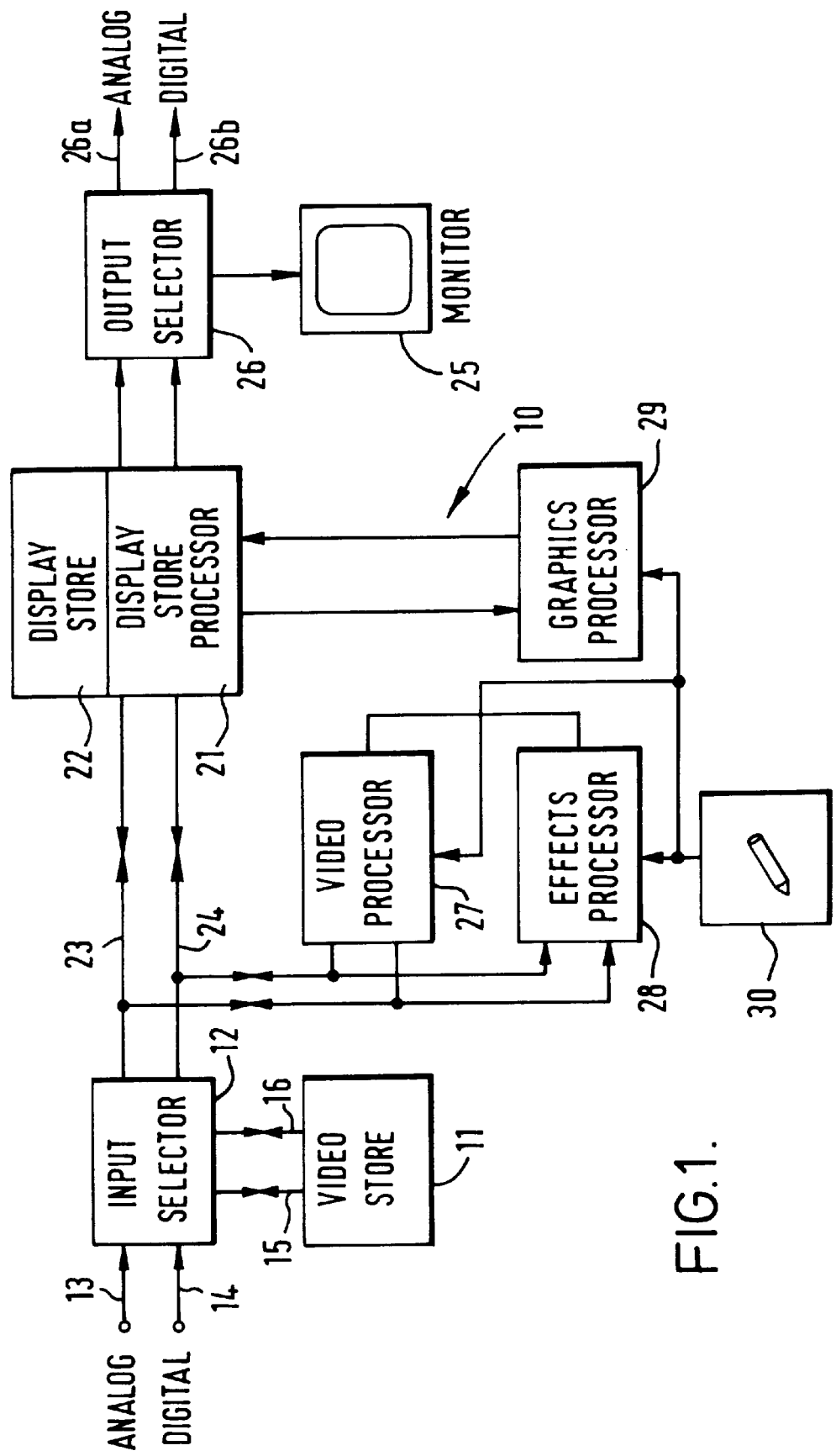

United States Patent

Beckwith

[11] Patent Number: 5,982,364
[45] Date of Patent: Nov. 9, 1999

[54] VIDEO PROCESSING SYSTEM INCLUDING FRAME POSITION INDICATORS

[75] Inventor: Timothy John Beckwith, Calcot Reading, United Kingdom

[73] Assignee: Quantel, Ltd., Newbury, United Kingdom

[21] Appl. No.: 08/628,930

[22] Filed: Apr. 8, 1996

Related U.S. Application Data

[63] Continuation-in-part of application No. 08/467,755, Jun. 6, 1995, Pat. No. 5,808,628, which is a continuation of application No. 08/030,823, Mar. 12, 1993, abandoned.

[30] Foreign Application Priority Data

Apr. 10, 1995 [GB] United Kingdom ................... 9507385

[51] Int. Cl.⁶ .................... G06F 3/153; G11B 27/028; H04N 5/265
[52] U.S. Cl. .................... 345/328; 345/507; 348/575; 348/715; 348/722; 707/104
[58] Field of Search ................... 345/326–328, 345/145, 156, 173–183, 961, 501, 520, 521, 507; 348/552, 722, 571, 575, 584, 601, 714–720; 382/305–307; 707/104

[56] References Cited

U.S. PATENT DOCUMENTS

| 4,667,221 | 5/1987 | Cawley et al. ......................... 348/587 |
| 4,688,106 | 8/1987 | Keller et al. ........................... 386/122 |
| 5,077,610 | 12/1991 | Searby et al. ......................... 348/593 |
| 5,107,252 | 4/1992 | Traynar et al. ........................ 345/139 |
| 5,109,482 | 4/1992 | Bohrman ............................... 345/328 |
| 5,142,616 | 8/1992 | Kellas et al. ........................... 345/435 |
| 5,175,622 | 12/1992 | Inoue et al. ........................... 348/584 |
| 5,175,625 | 12/1992 | Miles ..................................... 348/563 |
| 5,212,544 | 5/1993 | Kellar et al. ........................... 348/590 |
| 5,237,648 | 8/1993 | Mills et al. ............................. 345/433 |
| 5,307,456 | 4/1994 | MacKay ................................. 345/328 |
| 5,388,197 | 2/1995 | Rayner .................................. 345/328 |
| 5,404,316 | 4/1995 | Klingler et al. ........................ 345/328 |
| 5,513,306 | 4/1996 | Mills et al. ............................. 707/530 |
| 5,537,528 | 7/1996 | Takahashi et al. ..................... 707/512 |
| 5,577,190 | 11/1996 | Peters ................................... 345/501 |

FOREIGN PATENT DOCUMENTS

| 0171829 | 2/1986 | European Pat. Off. . |
| 0396415 | 11/1990 | European Pat. Off. . |
| 0560624 | 9/1993 | European Pat. Off. . |
| 0564247 | 10/1993 | European Pat. Off. . |
| 2156627 | 10/1985 | United Kingdom . |
| 2179819 | 3/1987 | United Kingdom . |
| 2248362 | 4/1992 | United Kingdom . |
| 2273220 | 6/1994 | United Kingdom . |
| WO9321595 | 10/1993 | WIPO . |
| WO9403897 | 2/1994 | WIPO . |

OTHER PUBLICATIONS

"New Features on Static RAMs and Dual–Port RAMs Enhance System Performance", 8080 Wescon 86/Conference Record 30 (1986) Nov. 18–20, Los Angeles, CA, USA.

*Primary Examiner*—U. Chauhan
*Attorney, Agent, or Firm*—Cooper & Dunham LLP

[57] ABSTRACT

An electronic video processing system comprises a store (11) for storing data defining plural video clips, and a processor (21, 27, 28, 29) for selecting from the stored video clips a plurality of clips and for selectively combining data defining the selected clips to form data defining a video story. A plurality of representative frames respectively representing selected video edits is displayable to portray a portion of the video story. Also, for each selected clip, a frame representative thereof is displayable together with a pair of smaller frames derived from the first and last frames of the clip.

18 Claims, 2 Drawing Sheets

5,982,364

VIDEO PROCESSING SYSTEM INCLUDING FRAME POSITION INDICATORS

CROSS REFERENCE TO RELATED APPLICATIONS

This application is a continuation-in-part of, commonly owned parent application Ser. No. 08/467,755 filed on Jun. 6, 1995, now U.S. Pat. No. 5,808,628, which in turn is a continuation of application Ser. No. 08/030,823 filed on Mar. 12, 1993 (abandoned).

BACKGROUND AND SUMMARY OF THE INVENTION

This invention relates to an electronic video processing system.

In our co-pending British Application No. 9205503.7 (Publication No. 2266037) filed on Mar. 13, 1992 and equivalent applications at the European Patent Office No. 93301889.7 (Publication No. 0560624) filed on Mar. 12, 1993, in the U.S. No. 08/030823 filed on Mar. 12, 1993, now U.S. Pat. No. 5,808,628, and in Japan No. 55786/1993 filed on Mar. 15, 1993, the contents of which are herein incorporated by reference, there is described an electronic video system for displaying a plurality of video clips having storing means for storing a multiplicity of video frames, a processor connected with said storing means, user operable input means connected with the processor and serving to enable the processor to fetch from and store in the storing means data of video frames comprising any one of said video clips, a display store connected to the processor for storing video clip frames brought by the processor from or supplied by the processor to the storing means and a monitor connected with the display store for displaying frames of video data brought by the processor to the display store.

The co-pending application and its equivalents also describes the display monitor as displaying and combining video clips in a variety of ways by user operable input means, specifically a pen and tablet, for example, by splicing, creation of dissolves etc., and in each case previewing of the combined clip is afforded so that the operator need not commit himself to a particular combination until he is completely satisfied with the form of the combined clip.

Whilst the system described in our co-pending applications referred to has proved to be commercially widely acceptable, one way in which it is capable of improvement has been identified. In using the described apparatus to assemble a story by combining and editing clips from a sequence of clips, the need to change edit points in the sequence or the order of clips in the sequence occurs frequently and involves scrolling through the sequence of clips until the region of the sequence is displayed which contains the frame or frames at which the editing is to take place or at which the order of the clips is to be changed. This is a time consuming process which is addressed by the present invention.

According to one aspect of the invention there is provided an electronic video processing system comprising: a store for storing data defining a plurality of video clips each comprising one or more video frames; a user operable input device; a processor connected to the input device and the store and responsive to operation of the input device for selecting from the stored video clips a plurality of clips and for selectively combining data defining the selected clips to form data defining a video story; and a display connected to the processor for displaying images defined by data output from the processor, wherein the processor is responsive to the user operable device to output data defining for selected video clips a respective representative frame, the processor thereby causing the display to display a plurality of representative frames which together portray a portion of the video story.

According to another aspect of the invention there is provided an electronic video editing system for combining a plurality of video edits each comprising a sequence of one or more video frames selected from a plurality of video clips so that the combined video edits form a video story, in which system a plurality of representative frames respectively representing selected video edits is displayable to portray a portion of the video story.

According to a further aspect of the invention there is provided an electronic video editing system for editing a video clip comprising a sequence of video frames to form a video edit comprising plural frames selected from the sequence, in which system a frame representative of the video edit is displayable together with a pair of smaller frames derived from the first and last frames of the edit.

The above and further features of the invention are set forth with particularity in the appended claims and together with advantages thereof will become clearer from consideration of the following detailed description of an exemplary embodiment of the invention given with reference to the accompanying drawings.

Figure 2:
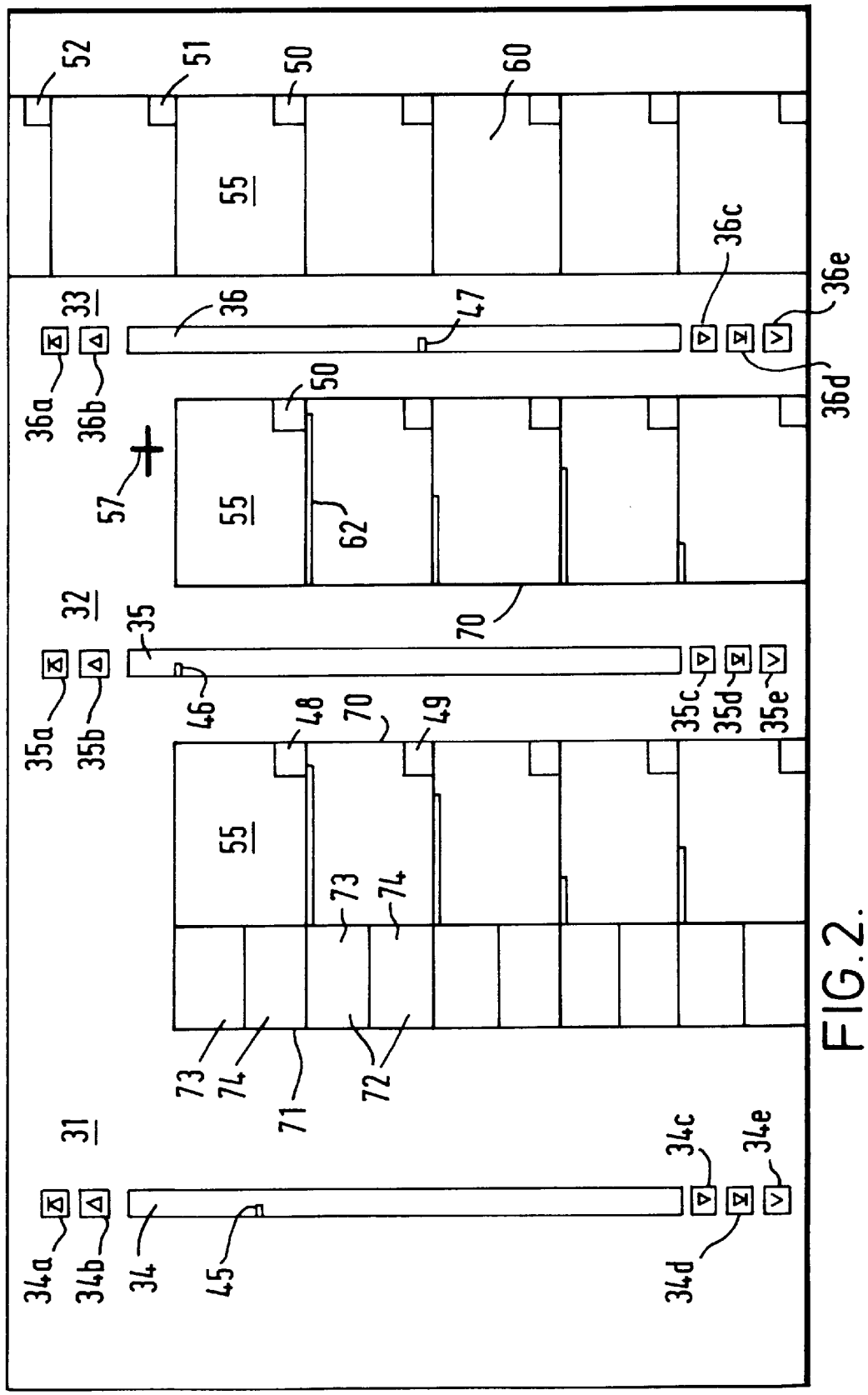

In the drawings:

FIG. 1 is a block diagram of a system capable of performing the present invention; and FIG. 2 illustrates a screen of a display monitor which is part of the system of FIG. 1.

Referring first to FIG. 1, which corresponds closely with FIG. 2 or our co-pending application referred to, there is shown an electronic video processing system 10 in which video clip data is stored in a video store 11. The video data is input to the video store 11 via an input selector 12 which includes both an analog input 13 and a digital input 14 to enable data to be input in either analog or digital format from an off-line bulk storage device or library (not shown) such as a VTR. The video clip data is stored in digital form in the video store 11 and the input selector therefore comprises a suitable converter for converting the incoming clip data into the required format. The input selector 12 is connected to the video store 11 via two bi-directional data paths 15, 16 each capable of conveying a full frame of data at at least video rate to and from the video store 11.

The video store as described in our co-pending application referred to, comprises at least two disc packs, each having two disc drive devices in parallel. Each pack requires two disc drives in order to achieve the necessary bandwidth since each disc is only able to receive or output data at approximately half broadcast standard video rate. The video store as more fully described in our co-pending application is a truly random access frame store which thereby enables frames from the same or different video clips to be accessed in a random order for output therefrom. The provision of two bi-directional paths 15, 16 enables two frames of data to be simultaneously written to or read from the store 11 or for one frame to be written to while another is read from the store 11. This enables a system 10 of great flexibility to be provided.

The system 10 further comprises a display store 22 which is connected via two bi-directional buses 23, 24 to the input selector 12. The display store 22 comprises a large scratch pad store for storing data relating to several frames of video and a display processor 21 for processing the frame data therein to produce respective frames of reduced size for concurrent display at different portions of a monitor 25, as will be described in greater detail hereinafter.

A video clip may be read out from the video store 11 and written directly to the display store 22 at video rate for display on the monitor 25 either at full size or at half, quarter or eighth size. Alternatively, video clips may be transferred from a bulk storage library (not shown) via the input selector 12 to the display store 22. Data from the display store 22 is read by an output selector 26 and output to the monitor 25 for display. This enables the user to preview one or more video clips or to identify video clips stored off-line in a bulk store library (not shown) for transfer to the video store 11. The output selector 26 also comprises both analog and digital outputs 26a, 26b, similar to the analog and digital inputs 13, 14 of the input selector 12, to enable video clip data to be output in either analog or digital format to the bulk storage device for example.

In an editing mode of operation data relating to a plurality of video clips is read out from the video store 11 a frame at a time to the display store 22 where the data is processed before being stored so as to enable several frames to be displayed simultaneously at different, overlapping, or shared, portions of the monitor 25, as described in greater detail in our co-pending application referred to. The processed data is output from the display store in raster order for display on the monitor 25. The video store has associated with it a video processor 27 and an effects processor 28. The video processor 27 is arranged to perform such operations as generating a keying signal, modifying colour, changing texture, and the effects processor 28 generates spatial effects such as changes of size, position and spin to one or more frames of a video clip, which operations and effects are all, per se, well known. Frames modifies by the video processor 27 and effects processor 28 are supplied or returned to the display store 22 for display on the monitor 25.

The display store 22 also has associated with it a graphics processor 29 which enables a user to paint into each frame as described in our British Patent No. 2,089,625 and/or to create a key or stencil as described in our British Patent No. 2,113,950. The graphics processor 29 is responsive to a user operable input device such as a pen or stylus and touch tablet combination 30, as indeed are the video processor 27, the effects processor 28 and the display store processor 21.

During editing the video processor in the display store 22 is arranged to generate from the input video clips a display that represents an editing environment such as the display shown in FIG. 2 of the accompanying drawings. As shown in FIG. 2, the display is divided into three distinct working areas 31, 32, 33 by three so-called reel bars 34, 35 and 36.

Each reel bar 34 to 36 includes a marker 45 to 47 which is movable along the reel bar to provide an indication of the position of the displayed frames in relation to the clip as a whole and each displayed frame includes at its bottom right hand corner an information box, for example 48 to 52, to provide a further indication of the positions of the displayed frames in the video clips. The information in each box may for example be the number, i.e. position, of the frame in the clip or it may be time codes generated by a VTR when the frames were originally recorded.

A cursor 57 which is generated by selection by the pen and tablet of an icon in a menu of facilities and is moved by movement of the pen on the touch tablet is used to control many operations performed by the system 10. The cursor is displayed by selection from a menu displayed on the monitor. One function which the cursor 57 can be used to control is that of selecting which frames from a selected clip are displayed in the working areas 31 to 33. The reel bars 34 to 36 each have associated direction control icons 34a to e, 35a to e and 36a to e. The reel bars, the control icons and the cursor are all generated by the processor 21 within the display store 22. Placing the cursor 57 over the icon 36a for example and pressing the stylus firmly on the touch tablet will cause the clip displayed in work area 33 to scroll up to the beginning of a subsequent clip whilst selecting icon 36b will cause the clip to scroll up to an event, such as a join, previously defined in the clip. Similar operations are performed by selection of the other icons as will be readily apparent to those possessed of the appropriate skills. When a scrolling icon is selected data relating to the appropriate video frames in the appropriate clip are read from the video store 11 to the display store 22. The data is processed to reduce the size of each frame and the processed data is then stored at locations in the store 22 corresponding to the position of the reduced frame on the monitor 25.

Video clips such as clip 60 to be used in compiling a video story are loaded from the bulk store (not shown) via the input selector 12 to the video store 11. One of the bi-directional paths, e.g. 15 is used to transfer the incoming video clip data to the video store 11 and this leaves the other path, e.g. path 16 free to transfer data relating to another video clip of the story. From the store 11, the data of the clip of the story can be read by the processor of the display store 22 into that store for display of the video on the monitor.

Once the desired clip or clips have been loaded into the video store 11 and selected frames thereof displayed on the monitor 25 the user can manipulate the clips as will now be described.

After loading of the clip 60 from the store 11, alone or in sequence with other clips to be used in the video story, into the display store 22 and displaying it in area 33 of the monitor, manipulating the pen and tablet or other suitable manually operable device in known manner causes the appropriate mode of operation of the display store processor to be selected for creating the video story from the loaded clip or clips.

It will be appreciated that video clips, such as clip 60, commonly comprise a large number of video frames and that not all frames in a clip will necessarily be selected for use in the video story. Also, some frames may be selected for use more than once in the video story. In practice a distinction is made between entire video clips and sequences of frames from a video clip that are selected to form a so-called video edit. It should be noted that a video edit may, of course, comprise all frames of a video clip. It follows that a video story comprises a plurality of video edits each of which, in turn, comprises one or more video frames from a video clip. Since video clips and video edits both comprise one or more video frames, and for the sake of simplification, no distinction will be made between video clips and video edits in the following description.

Once the data representing the clip 60 has been loaded into the store 11 and frames thereof displayed on the monitor, the clip can be manipulated by the user to contribute to the video story. The user first selects by means of the pen and tablet 30 and the cursor 57 a frame, say frame 55, of the clip 60 as a frame which is representative of the action portrayed by the clip 60. When the cursor is located over the frame, the pen is pressed down on the tablet and such pressure attaches the cursor to the frame 50. By movement of the cursor by means of dragging of the pen on the tablet, to the working area 32 a copy of the frame 55 appears in the area 32 together with an indicator in the form of a distinctively coloured strip 62 extending alongside the bottom edge of the frame from the left hand end thereof. The length of the strip is an indication of the location of the representative frame 55 in its associated clip. Thus, the shorter the strip the nearer the frame 55 is located to the beginning of the clip and the longer the strip the nearer the frame 55 is located to the end of the clip.

The user can now locate the cursor 57 by means of the pen over the right hand end of the indicating strip 62 and by then applying pressure to the pen and moving the pen on the tablet in the direction of the strip, the length of the strip can be varied. In changing the length of the strip 62 the representative frame 55 is changed to a different frame of the clip which is located at a point in the clip which depends on the new length of the clip. By moving the cursor in this manner along the direction of the strip, the entire clip 60 can be sequenced and the image displayed can be changed to that of any other frame of the clip by lifting the pen when the desired frame is displayed. Alternatively, this sequencing of the clip may be effected by causing sidewards movement of the cursor on the frame rather than on the indicating strip 62.

The procedure is then repeated for further clips which are to be employed in the video story to the end of providing in the working area 32 a column 70 of frames each with its own indicating strip and respectively representing each of the clips including the original clip 50 and further clips that are employed in the video story. The further clips can be brought into the display store 22 either one at a time by the display processor 21 and displayed to provide the corresponding frame for the column 70 or they can be brought successively into the display store and attached one to the next so that the entire length of the clips forming the story can be sequentially displayed using the scrolling facility mentioned earlier.

At this juncture the clips are not necessarily in the order required for the story. To rearrange the order of the clips, the pen and tablet is manipulated to bring the cursor 57 over one of the representative frames in the column 70, the position of the associated clip of which requires to be changed. The cursor is then attached to this frame by pressing down the pen on the tablet and can then be caused to drag the attached frame by movement of the pen over the tablet until the cursor is located over the junction between adjacent representative frames of the column 70 at which the clip of the moved representative frame is to be introduced. Release of the pressure on the pen then interposes the representative frame of the clip between the frames of the column at which the cursor is located. This operation is repeated as necessary on different representative frames of the column 70, the associated clips of which have to be repositioned in the clip sequence to meet the story requirements.

It will be appreciated that the column 70 of frames representative of associated clips comprises, as it were, a table of contents of the story comprised by the assembled clips and enable the user quickly to access any part of the story of interest to him. Also, a video story may comprise numerous clips. It should be noted that in such circumstances the column 70 of representative images will at any given time merely depict a portion of the entire video story. The column 70 may be scrolled up or down by way of the reel bars 34 to 36 and markers 45 to 47, as described in our co-pending application referred to, in order to view other portions of the video story.

By appropriate command, imparted by means of the pen and tablet, the processor 21 can be ordered to display in the working area 31 a copy of the column 70 of clip representative frames together with a further column 71 of equally sized, reduced size frames or images 72, suitably eighth size images, which extend alongside the column so that for each image of the column 70, there is a pair of images 73, 74 the combined vertical height of which occupies the vertical height of the corresponding image of the column 70. The images 73, 74 are respectively the first and last of the visible images of the clip represented by the representative frame of the column 70 adjacent the images 73, 74.

By moving the cursor by means of the pen and tablet over one of the images 73, 74, e.g. the image 74, and pressing the pen down on the tablet and holding it so pressed whilst moving it from side to side the frames of the corresponding clip, particularly the last part thereof, can be sequenced and the point of connection of the clip to the adjoining clip thereby changed simply by releasing the pressure on the pen when the desired frame appears as the image 74. The image so appearing becomes the last visible frame of the corresponding clip. During sequencing of the images to change the image 74, the corresponding representative frame in the column 70 is changed to that displayed as image 74. By performing in like manner on one of the image 73, the first visible frame of the corresponding clip can be changed. In this way, the length of the clip, or more correctly the length of the video edit, contributing to the video story can be changed at will by the user.

Where adjoining clips forming the story have been spliced as described in connection with FIG. 4 of our co-pending application referred to and its equivalents filed in Europe, U.S.A. and Japan, the disclosures of which are incorporated herein by reference, the joins between clips may involve not using a frame or frames of the clips concerned at the joins. Such frames, usually referred to as "hidden" frames can be sequenced in series with the visible frames of the associated clip when the images 73 and 74 are subjected to change as described. This gives greater flexibility when deciding where the join between clips is to take place.

Having now described the manner of performing an embodiment of the invention, it will be apparent that the embodiment provides a quick means of identifying a clip from the representative frame of the clip displayed with the indicating means 61 and sequencing through it. Also, the column 70 of representative frames together with their indicating strips enables ready access to parts of a video story formed by the series of clips without having to use the scrolling facility, which by comparison is tedious. Further, a series of clips reduced to the column 70 can be rapidly re-ordered to suit dictates of the video story. Such advantages are obtained even before the additional facilities provided by the further column 71 of images 73 and 74 are available, such facilities affording the additional advantages of initially showing the first and last visible frame of the corresponding clip, of being able to sequence through the end frames not only of the visible frames of the clip but also of those frames which adjoin the visible frames thus enabling the latter frames to be employed in the story, and, of avoiding the use of previously visible frames at a newly determined join. The determination of a new join between clips is further facilitated by the fact that as image sequencing is performed on the images 73 and/or 74 the corresponding representative frame of the associated clip changes so that the frame appearing as image 73 or 74, depending on which of these is being sequenced, also appears as the adjoining clip representative image. This makes it easier to locate a desired point at which to make a new join because the size, and therefore the resolution, of the representative frame in the column 70 is twice that of the corresponding small sized image 73, 74.

Having thus described the present invention by reference to a preferred embodiment it is to be well understood that the embodiment in question is exemplary only and that modifications and variations such as will occur to those possessed of appropriate knowledge and skills may be made without departure from the spirit and scope of the invention as set forth in the appended claims and equivalents thereof.

I claim:

1. An electronic video processing system comprising:

a store for storing data defining a plurality of video clips each comprising one or more video frames;

a user operable input device;

a processor connected to the input device and the store and responsive to operation of the input device for selecting from the stored video clips a plurality of clips and for selectively combining data defining the selected clips to form data defining a video story; and a display connected to the processor for displaying images defined by data output from the processor, wherein:

the processor is responsive to the user operable device to output data defining for selected video clips a respective representative frames the processor thereby causing the display to display a plurality of representative frames which together comprise a portion of the video story, together with respective indicators for each said representative frame which indicators indicate the position of the representative frame in its respective video clip, a representative frame is selectable by manipulating the cursor relative to the indicator displayed with the representative frame, the processor being arranged to respond to further movement of the cursor both by replacing the selected representative frame with another frame of the represented clip and by adjusting the indicator to indicate the location of the other frame in the represented clip.

2. A system as claimed in claim 1, wherein the processor is operable to cause the display to display a cursor at a position determined by manipulation of the user operable device.

3. A system as claimed in claim 2, wherein a representative frame is selectable by the cursor, the processor being arranged to respond to further manipulation of the cursor by displaying another frame in the represented clip as the representative frame.

4. A system as claimed in claim 3, wherein the processor is arranged to display other frames in response to sideways movement of the cursor.

5. A system as claimed in claim 2, wherein the processor is arranged to output data representing plural frames of a clip for display in sequence on the display, thereby to enable selection of a representative frame for display on the display separately from the clip represented thereby.

6. A system as claimed in claim 5, wherein the processor is arranged to output data defining an associated indicator which indicates the position of the representative frame in the represented clip for display with the representative frame.

7. A system as claimed in claim 5, wherein the displayed representative frames and their associated indicators are displayed in an area of the display as a sequence of frames.

8. A system as claimed in claim 1, wherein the indicator comprises an elongated strip and the processor is arranged to display said other frames and change the length of the strip in response to movement of the cursor lengthwise of the strip.

9. A system as claimed in claim 1, wherein the indicating means is a distinctively marked narrow strip displayed on the display alongside the displayed representative frame.

10. A system as claimed in claim 1, wherein the processor is responsive to the user operable device to output data defining the start and end frames of each selected video clip for display together with the respective representative frames as a pair of reduced sized frames on the display, the start and end frames of the clip of the associated representative frame being displayed as a sequence on the display.

11. A system as claims in claim 10, wherein the data defining the start and end frames is output together with further date defining the representative frames, thereby enabling the display to display the representative frames in one display area and simultaneously to display the sequence of representative frames and start and end frames in another display area.

12. A system as claimed in claim 10, wherein the sequence of representative frames is displayed as a column of frames together with respective indicators displayed as narrow, distinctively marked strips between pairs of the representative frames and said reduced size frames are displayed as a column of frames alongside the column of representative frames, each pair of reduced size frames occupying the vertical height of the associated representative frame.

13. A system as claimed in claim 10, wherein the data defining the video story comprises data representing one or more selected frames of each clip, and the processor is so arranged to respond to manipulation of the user operable device that movement of the cursor relative to a chosen reduced size frame causes the representative frame associated with the chosen reduced size frames to sequence through the selected frames of the corresponding clip and also through frames beyond the selected frames, of the clip not used in the video story.

14. A system as claimed in claim 13, wherein the user operable device is a pen and tablet device and movement of said curser is effected by holding the pen under pressure in contact with the tablet and moving the pen relatively to the tablet whilst said pressure is maintained.

15. A system as claimed in claim 14, wherein selection of the frames being sequenced occurs when said pressure is relieved.

16. A system as claimed in claim 1, further comprising access means connecting the store with the display, which access means is capable of transferring video data at video rate between the display and the store.

17. A system as claimed in claim 1, wherein the processor comprises a separate video processor and a display processor incorporated together with a display store in the display.

18. A system as claimed in claim 1, wherein the display is arranged to display the representative frames in a user selected order as a column of frames in an area of the display, and the processor is arranged to combine selectively the data defining the video clips in an order corresponding to the user selected order of the representative frames in the displayed column of frames.

* * * * *